(12) United States Patent
Takahara

(10) Patent No.: US 9,610,740 B2
(45) Date of Patent: Apr. 4, 2017

(54) TIRE PUNCTURE SEALING AGENT

(71) Applicant: THE YOKOHAMA RUBBER CO., LTD., Minato-ku, Tokyo (JP)

(72) Inventor: Hideyuki Takahara, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 14/917,188

(22) PCT Filed: Sep. 3, 2014

(86) PCT No.: PCT/JP2014/073150
§ 371 (c)(1),
(2) Date: Mar. 7, 2016

(87) PCT Pub. No.: WO2015/033949
PCT Pub. Date: Mar. 12, 2015

(65) Prior Publication Data
US 2016/0214337 A1    Jul. 28, 2016

(30) Foreign Application Priority Data

Sep. 9, 2013 (JP) .................................. 2013-186355

(51) Int. Cl.
B29C 73/16 (2006.01)
(52) U.S. Cl.
CPC ................................... B29C 73/163 (2013.01)
(58) Field of Classification Search
CPC ..................................................... B29C 73/163
USPC .......................... 523/166; 521/65, 70, 71, 72
See application file for complete search history.

(56) References Cited

U.S. PATENT DOCUMENTS

| | | | |
|---|---|---|---|
| 4,501,825 A | 2/1985 | Magyar et al. | |
| 7,841,370 B2 * | 11/2010 | Engel | B60C 5/004 |
| | | | 141/2 |
| 8,148,448 B2 | 4/2012 | Takahara et al. | |
| 8,362,110 B2 | 1/2013 | Schunack et al. | |
| 8,470,909 B2 | 6/2013 | Takahara et al. | |
| 2005/0277712 A1 * | 12/2005 | Daly | B29C 73/163 |
| | | | 524/17 |
| 2012/0309867 A1 | 12/2012 | Takahara | |
| 2013/0072594 A1 * | 3/2013 | Okamatsu | B29C 73/163 |
| | | | 523/166 |
| 2014/0221527 A1 | 8/2014 | Naruse | |

FOREIGN PATENT DOCUMENTS

| | | |
|---|---|---|
| DE | 10 2008 007 992 A1 | 8/2009 |
| DE | 10 2010 030 320 A1 | 12/2011 |
| DE | 11 2010 000 061 T5 | 6/2012 |
| DE | 11 2011 100 453 T5 | 11/2012 |
| EP | 1 375 197 A1 | 1/2004 |
| JP | S61-14277 A | 1/1986 |
| JP | 2002-332475 A | 11/2002 |
| JP | 2010-260911 A | 11/2010 |
| JP | 2013-006949 | 1/2013 |
| JP | 2013-040297 | 2/2013 |

OTHER PUBLICATIONS

Office Action dated Dec. 21, 2016 issued to the corresponding German Patent Application No. 11 2014 004 125.4 with the English translation thereof.

* cited by examiner

*Primary Examiner* — Edward Cain
(74) *Attorney, Agent, or Firm* — Carrier Blackman & Associates, P.C.; Joseph P. Carrier; Anne G. Sabourin

(57) ABSTRACT

The objective of the present invention is to provide a tire puncture sealing agent, the liquid amount of which can be reduced while maintaining excellent sealability and injectability. A tire puncture sealing agent of the present invention has a ratio of the increase in volume of 15 to 120% measured by Blender Test defined in ASTM Specification D3519-88.

10 Claims, No Drawings

TIRE PUNCTURE SEALING AGENT

TECHNICAL FIELD

The present invention relates to a tire puncture sealing agent.

BACKGROUND ART

In recent years, there has been an increase in instances where a puncture repair kit is introduced as a standard equipment or an optional equipment in an automobile.

For the puncture repair kit, a configuration in which a tire puncture sealing agent (a tire puncture sealing material), an optional compressor, and the like are combined, is known. Actual products are generally compact packages that combine the tire puncture sealing agent, known as an "emergency tire puncture repairing agent" or the like, and a low capacity compressor that draws power via a cigarette lighter socket.

As the tire puncture sealing agent, for example, "a tire puncture sealing agent containing a natural rubber latex and/or a synthetic resin emulsion and propylene glycol, the propylene glycol/water ratio being from 0.5 to 1.1, and the viscosity at −20° C. when a BL-type viscometer is used being from 100 to 1,200 mPa·s at a revolution speed of 60 rpm" is described in the Patent Document 1 (Claim 1).

In the Patent Document 2, "a tire puncture sealing agent comprising (A) a natural rubber latex, (B) a synthetic resin emulsion, (C) an aqueous dispersion of organic particles, and (D) anti-freezing agent, a solid content compounding ratio of (A) the natural rubber latex and (B) the synthetic resin emulsion being 5/95 to 20/80 as [(the solid content mass of (A) the natural rubber latex)/(the solid content of (B) the synthetic resin emulsion)], the solid content of (C) the aqueous dispersion of organic particles being 0.05 to 1.5 parts by mass per 100 parts by mass of the total of the solid content mass of (A) the natural rubber latex and the solid content mass of (B) the synthetic resin emulsion, and the average particle size of the organic particles being not greater than 15 μm" (Claim 1) is also described.

CITATION LIST

Patent Literature

Patent Literature 1: Japanese Unexamined Patent Application Publication No. 2013-040297A
Patent Literature 2: Japanese Unexamined Patent Application Publication No. 2013-006949A

SUMMARY OF INVENTION

Technical Problem

Upon studying the tire puncture sealing agents described in the Patent Documents 1 and 2, the present inventors discovered that, though sealability and injectability were excellent, there was a room for reducing the amount of the liquids, thereby reducing the size of the storage container while maintaining the characteristics of the sealing agents.

Thus, the objective of the present invention is to provide a tire puncture sealing agent, the liquid amount of which can be reduced while maintaining excellent sealability and injectability.

Solution to Problem

As a result of diligent study to solve the problem above, the present inventors discovered that the liquid amount of the tire puncture sealing agent can be reduced while maintaining excellent sealability and injectability by using a tire puncture sealing agent having a ratio (%) of the increase in volume within a certain range, and achieved the present invention.

Specifically, the inventors discovered that the problems described above can be solved by the following features.

(1) A tire puncture sealing agent having a ratio of the increase in volume of 15 to 120% measured by Blender Test defined in ASTM Specification D3519-88.

(2) The tire puncture sealing agent according to (1), comprising a natural rubber latex and/or a synthetic resin emulsion and a foaming agent.

(3) The tire puncture sealing agent according to (2), in which the content of the foaming agent is 1 to 20 parts by mass per 100 parts by mass of the total of the solid content of the natural rubber latex and the synthetic resin emulsion.

(4) The tire puncture sealing agent according to (2) or (3), in which the tire puncture sealing agent comprises at least the natural rubber latex among the natural rubber latex and the synthetic resin emulsion, and the foaming agent is a sulfate ester salt.

(5) The tire puncture sealing agent according to (4), in which the sulfate ester salt is at least one type selected from the group consisting of alkyl sulfates and polyoxyethylene alkyl ether sulfates.

(6) The tire puncture sealing agent according to (4) or (5), in which the sulfate ester salt is at least one type of salt selected from the group consisting of triethanolamine, sodium and ammonium.

Advantageous Effects of Invention

As described above, according to the present invention, a tire puncture sealing agent, the liquid amount of which can be reduced while maintaining excellent sealability and injectability, can be provided.

DESCRIPTION OF EMBODIMENTS

A tire puncture sealing agent of the present invention has a ratio of the increase in volume of 15 to 120% measured by Blender Test defined in ASTM Specification D3519-88.

The ratio of the increase in volume is a value (%) measured by Blender Test defined in ASTM Specification D3519-88.

In the present invention, it is possible to reduce the amount of the tire puncture sealing agent to about ⅔ or less of the conventionally known tire puncture sealing agent while maintaining excellent sealability and injectability using a tire puncture sealing agent having a ratio of the increase in volume of 15 to 120%.

Although the reason is not clear in detail, it is assumed to be as follows.

As described in the Patent Document 2, tire puncture sealing agents are typically introduced into a tire interior via air injection part (valve) of the punctured tire. After the tire is filled with air to a predetermined air pressure, the tire puncture sealing agents reaches a puncture hole as a result of the vehicle running a specific distance. Then, aggregates of the tire puncture sealing agent form due to compressive forces and shear forces exerted on the tire as it rotates and contacts the ground, thereby sealing the puncture holes. Thus, it is possible to drive the vehicle to an auto-repair shop, a gas station or the like so that the tire can be replaced.

Therefore, it is considered that the injection of a tire puncture sealing agent having a ratio of the increase in volume of 15 to 120% into a punctured tire, followed by blending and foaming of the tire puncture sealing agent while the vehicle is running a specific distance, enables the tire puncture sealing agent to reach the puncture hole even if its amount is less.

In the present invention, the ratio of the increase in volume is preferably 30 to 120% and more preferably 80 to 120%, because the tire puncture sealing agent can easily reach the shoulder groove portion of a tire tread as well.

As a preferred embodiment of the tire puncture sealing agent having a ratio of the increase in volume of 15 to 120%, the tire puncture sealing agent including a natural rubber latex and/or a synthetic resin emulsion and a foaming agent are discussed in detail hereafter.

Note that, the synthetic resin emulsion discussed below, a phase of the resin which is a dispersoid may be in a liquid phase or solid phase.

In general, a system in which a liquid phase dispersoid is dispersed in a liquid phase dispersion medium is called an "emulsion", and a system in which a solid phase dispersoid is dispersed in a liquid phase dispersion medium is called a "suspension"; however, in the present invention, the term "emulsion" includes "suspension".

<Natural Rubber Latex>

The natural rubber latex described above is not particularly limited, and a conventionally known natural rubber latex can be used.

Specific examples of the natural rubber latex include material sampled from *Hevea brasiliensis* tree by tapping, and so-called "deproteinized natural rubber latex", which is protein-free natural rubber latex.

<Synthetic Resin Emulsion>

The synthetic resin emulsion is not particularly limited, and conventionally known synthetic resin emulsions can be used.

Specific examples of synthetic resin emulsions include urethane emulsions, acrylic emulsions, polyolefin emulsions, ethylene-vinyl acetate copolymer emulsions, polyvinyl acetate emulsions, ethylene-vinyl acetate-vinyl versatate copolymer emulsions, and polyvinyl chloride emulsions. These can be used alone or in combination of two or more kinds.

Among these, because of better sealability and excellent storage performance, ethylene-vinyl acetate copolymer emulsions and ethylene-vinyl acetate-vinyl versatate copolymer emulsions are preferred and ethylene-vinyl acetate-vinyl versatate copolymer emulsions are more preferred.

In the present invention, when the natural rubber latex and/or the synthetic resin emulsion are compounded, the total of solid contents of the natural rubber latex and the synthetic resin emulsion is preferably 20 to 40 mass % of the tire puncture sealing agent and more preferably 25 to 35 mass % of the tire puncture sealing agent, because of excellent sealability and injectability.

"The total of solid contents of the natural rubber latex and the synthetic resin emulsion" herein refers to the total mass of the solid content (natural rubber) of the natural rubber latex and the solid content (synthetic resin) of the synthetic resin emulsion, when both the natural rubber latex and the synthetic resin emulsion are used. But "the total of solid contents of the natural rubber latex and the synthetic resin emulsion" refers to the solid content (synthetic resin) of the synthetic resin emulsion if the natural rubber latex is not used, while it refers to the solid content (natural rubber) of the natural rubber latex if the synthetic resin emulsion is not used.

<Foaming Agent>

The foaming agent is not limited as long as it can control the ratio of the increase in volume for the tire puncture sealing agent in the range described above.

Specific examples of the foaming agents include sulfates ester salts, alkyl benzene sulfonate, alkali metal salts of fatty acids, N-acyl-N-methyltaurine, dialkyl sulfosuccinate, N-alkyl-N,N-dimethyloxide and the like, and these may be used alone or in combination.

Among these, sulfates ester salts are preferable because sealability is improved and they facilitate the control of the ratio of the increase in volume, if at least the natural rubber latex is included, among the natural rubber latex and the synthetic resin emulsion described above.

As sulfate ester salts described above, at least one type selected from the group consisting of alkyl sulfates and polyoxyethylene alkyl ether sulfates is preferable, because the sealability manifests promptly.

Examples of the alkyl sulfates include the compound represented by the formula (1) below and examples of the polyoxyethylene alkyl ether sulfates include the compound represented by the formula (2) below.

[Formula 1]

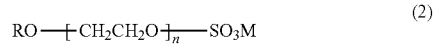

In the formulas, R are each independently an alkyl group having from 1 to 20 carbons; M are each independently a base of sulfonic acid, n are an integer from 1 to 15.

Specific examples of an alkyl group having from 1 to 20 carbons in the formula above include a methyl group, an ethyl group, a propyl group, a butyl group, a pentyl group, a hexyl group, a heptyl group, an octyl group, an ethylhexyl group, a nonyl group, a decyl group, a dodecyl group (a lauryl group), an undecyl group, a hexadecyl group, an octadecyl group, a cyclopropylmethyl group, and a trifluoromethyl group. Among these, a long-chain alkyl group having 10 to 20 carbons is preferable.

Specific examples of a base represented by M include a triethanolamine salt, a sodium salt, an ammonium salt and the like, and a triethanolamine salt is preferable among these.

In the present invention, when the natural rubber latex and/or the synthetic resin emulsion are compounded, the content of the foaming agent is preferably 1 to 20 parts by mass, and more preferably 10 to 20 parts by mass per 100 parts by mass of the total solid content of the natural rubber latex and the synthetic resin emulsion.

<Anti-Freezing Agent>

The tire puncture sealing agent of the present invention preferably includes an anti-freezing agent.

The anti-freezing agent is not particularly limited, and a conventionally known anti-freezing agent can be used.

Specific examples of the anti-freezing agents include an ethylene glycol, a propylene glycol, a diethylene glycol, a glycerin, a methanol, an ethanol, an isopropyl alcohol and the like. These can be used alone or in combination.

<Additives>

The tire puncture sealing agent of the present invention, in addition to the above components, can include as desired when necessary, various additives such as, for example, fillers, anti-aging agents, antioxidants, pigments (dyes), plasticizers, thixotropic agents, UV absorbents, flame retardants, surfactants (including leveling agents), dispersants, dehydrating agents, and antistatic agents.

<Production Method>

The method of manufacturing the tire puncture sealing agent of the present invention is not particularly limited, but can be, for example, a method in which the natural rubber latex, and/or the synthetic resin emulsion, and, the foaming agent, and optionally, any anti-freezing agent, and the various additives described above are sufficiently mixed under a reduced pressure using a mixer such as a combination mixer, or the like.

WORKING EXAMPLES

The present invention will now be described in greater detail using the following working examples, but is in no way limited to these examples.

Working Examples 1 to 8 and Comparative Examples 1 to 4

The components shown in Table 1 below were blended in a mixer according to the compositions shown in Table 1 so as to obtain the tire puncture sealing agents shown in Table 1. It should be noted that they were prepared according to the values listed in parenthesis in Table 1 so that the total solid content of the natural rubber latex and the synthetic resin emulsion was 100 parts by mass.

Each of the prepared tire puncture sealing agents was evaluated for the ratio of the increase in volume, sealability, and injectability according to the methods described below. These results are shown in Table 1.

<Ratio of the Increase in Volume>

The ratio of the increase in volume is a value (%) measured by Blender Test defined in ASTM Specification D3519-88.

<Sealability>

A puncture hole (diameter: 4 mm) was made in the shoulder groove portion of the tread of a tire.

Next, the punctured tire was mounted on a drum tester, 250 mL (250 g) of each tire puncture sealing agent prepared was injected via the tire valve and the tire was then filled with air until the pressure inside the tire reached 150 kPa.

The tire was then subjected to intermittent driving, in which the tire was repeatedly driven for one minute at a speed of 30 km/h under a load of 350 kg and then stopped, until there was no air permeation observed. The presence or absence of the air permeation was determined by visual inspection or by spraying soap water in the vicinity of the puncture hole.

The sealing performance was evaluated by the following criteria based on the number of cycles of intermittent driving until the puncture hole to be sealed.

⊚: Seal completed at 5 cycles or less
○: Seal completed at 6 to 10 cycles or less
Δ: Seal completed at 11 to 20 cycles or less
X: Seal not completed even at 21 cycles or more <Injectability>

250 mL (250 g) of each tire puncture sealing agent prepared was heated to 70° C. and injected via the tire valve while heating the sealing agent so as not to lower its temperature, and injectability was evaluated according to the criteria below.

○: It was possible to inject the whole amount.
X: It was not possible to inject the whole amount.

TABLE 1

| | | Comparative Example | | Working Example | | | Comparative Example |
|---|---|---|---|---|---|---|---|
| Table 1-1 | | 1 | 2 | 1 | 2 | 3 | 3 |
| Natural rubber latex | NR (solid content) | 116.7 (70) | 116.7 (70) | 116.7 (70) | 116.7 (70) | 116.7 (70) | 116.7 (70) |
| Synthetic resin emulsion | VEVA (solid content) | 55.7 (30) | 55.7 (30) | 55.7 (30) | 55.7 (30) | 55.7 (30) | 55.7 (30) |
| Foaming agent | Lauryl sulfate (triethanolamine salt) | | 0.5 | 1.0 | 10.0 | 20.0 | 25.0 |
| | Polyoxyethylene alkyl ether sulfate (triethanolamine salt) | | | | | | |
| | Alkylbenzene sulfonic acid (triethanolamine salt) | | | | | | |
| | Lauryl sulfate (sodium salt) | | | | | | |
| | Lauryl sulfate (ammonium salt) | | | | | | |
| | Sodium salt of naphthalene sulfonate formaldehyde condensates (sodium salt) | | | | | | |
| | Polyoxyethylene lauryl ether | | | | | | |
| Ratio of the increase in volume (%) | | 5 | 9 | 17 | 85 | 118 | 135 |
| Sealability (liquid amount ratio to the conventional material: about 2/3) | | Δ | Δ | ○ | ⊚ | ⊚ | ⊚ |
| Injectability | | ○ | ○ | ○ | ○ | ○ | X |

TABLE 2

| | Table 1-2 | Working Example 4 | 5 | 6 | 7 | 8 | Comparative Example 4 |
|---|---|---|---|---|---|---|---|
| Natural rubber latex | NR (solid content) | 116.7 (70) | 116.7 (70) | 116.7 (70) | 116.7 (70) | 116.7 (70) | 116.7 (70) |
| Synthetic resin emulsion | VEVA (solid content) | 55.7 (30) | 55.7 (30) | 55.7 (30) | 55.7 (30) | 55.7 (30) | 55.7 (30) |
| Foaming agent | Lauryl sulfate (triethanolamine salt) | | | | | | |
| | Polyoxyethylene alkyl ether sulfate (triethanolamine salt) | 10.0 | | | | | |
| | Alkylbenzene sulfonic acid (triethanolamine salt) | | 10.0 | | | | |
| | Lauryl sulfate (sodium salt) | | | 10.0 | | | |
| | Lauryl sulfate (ammonium salt) | | | | 10.0 | | |
| | Sodium salt of naphthalene sulfonate formaldehyde condensates (sodium salt) | | | | | 10.0 | |
| | Polyoxyethylene lauryl ether | | | | | | 10.0 |
| Ratio of the increase in volume (%) | | 80 | 40 | 60 | 45 | 30 | 10 |
| Sealability (liquid amount ratio to the conventional material: about 2/3) | | ◎ | ○ | ○ | ○ | ○ | X |
| Injectability | | ○ | ○ | ○ | ○ | ○ | ○ |

Details of the components described in Table 1 are as follows.

NR latex: Natural rubber latex (Hytex HA, manufactured by Fulflex and available from Nomura Trading Co., Ltd.; Solid content=60 mass %)

VEVA emulsion 1: Ethylene-vinyl acetate-vinyl versatate copolymer resin emulsion (product name: Sumikaflex 950HQ, manufactured by Sumika Chemtex Co., Ltd.; Solid content=53 mass %)

Lauryl sulfate (triethanolamine salt): EMAL TD (molecular weight: 405), manufactured by Kao Corporation.

Polyoxyethylene alkyl ether sulfate (triethanolamine salt): EMAL 20T, manufactured by Kao Corporation.

Alkyl benzene sulfonic acid (triethanolamine salt): NEOPELEX GS, manufactured by Kao Corporation.

Lauryl sulfate (sodium salt): EMAL 10G (molecular weight: 272), manufactured by Kao Corporation.

Lauryl sulfate (ammonium salt): LATEMUL AD-25 (molecular weight: 267), manufactured by Kao Corporation.

Sodium salt of naphthalene sulfonate formaldehyde condensates: DEMOL N, manufactured by Kao Corporation.

Polyoxyethylene lauryl ether (EMULGEN 150, manufactured by Kao Corporation)

As evident from the results listed in Table 1, it was found that the tire puncture sealing agents of Comparative Examples 1, 2 and 4, which had the ratios of the increase in volume less than 15%, were not able to achieve the sealability, if the liquid amounts thereof were about 2/3 of that of the conventional tire puncture sealing agent (about 450 mL).

It was also found that the Comparative Example 3, which had the ratio of the increase in volume greater than 120%, exhibited poor injectability even if the liquid amount thereof was about 2/3 of that of the conventional tire puncture sealing agent (about 450 mL).

It was found that the tire puncture sealing agent (Working Examples 1 to 8), which had 15 to 120% of the ratio of the increase in volume, could retain excellent sealability and injectability even if the liquid amount thereof was about 2/3 of that of the conventional tire puncture sealing agent (about 450 mL).

It was also found that, comparing the Working Examples 1 to 3, the tire puncture sealing agent having 80 to 120% of the ratio of the increase in volume could exhibit even better sealability.

Furthermore, it was found that, comparing the Working Examples 2, 6 and 7, when the sulfate ester salt as a foaming agent is triethanolamine salt, the ratio of the increase in volume is not less than 80%, and the sealability is more excellent.

The invention claimed is:

1. A tire puncture sealing agent comprising a natural rubber latex and/or a synthetic resin emulsion and a foaming agent, having a ratio of the increase in volume of 15 to 120% measured by Blender Test defined in ASTM Specification D3519-88.

2. The tire puncture sealing agent according to claim 1, wherein the content of the foaming agent is 1 to 20 parts by mass per 100 parts by mass of the total solid content of the natural rubber latex and the synthetic resin emulsion.

3. The tire puncture sealing agent according to claim 1, wherein the tire puncture sealing agent comprises at least the natural rubber latex among the natural rubber latex and the synthetic resin emulsion, and the foaming agent is a sulfate ester salt.

4. The tire puncture sealing agent according to claim 3, wherein the sulfate ester salt is at least one type selected from the group consisting of alkyl sulfates and polyoxyethylene alkyl ether sulfates.

5. The tire puncture sealing agent according to claim 3, wherein the sulfate ester salt is at least one type of salt selected from the group consisting of triethanolamine, sodium, and ammonium.

6. The tire puncture sealing agent according to claim 2, wherein the tire puncture sealing agent comprises at least the natural rubber latex among the natural rubber latex and the synthetic resin emulsion, and the foaming agent is a sulfate ester salt.

7. The tire puncture sealing agent according to claim 6, wherein the sulfate ester salt is at least one type selected from the group consisting of alkyl sulfates and polyoxyethylene alkyl ether sulfates.

8. The tire puncture sealing agent according to claim 4, wherein the sulfate ester salt is at least one type of salt selected from the group consisting of triethanolamine, sodium, and ammonium.

9. The tire puncture sealing agent according to claim 6, wherein the sulfate ester salt is at least one type of salt selected from the group consisting of triethanolamine, sodium, and ammonium.

10. The tire puncture sealing agent according to claim 7, wherein the sulfate ester salt is at least one type of salt selected from the group consisting of triethanolamine, sodium, and ammonium.

* * * * *